United States Patent
Liao et al.

(10) Patent No.: US 10,545,913 B1
(45) Date of Patent: Jan. 28, 2020

(54) DATA STORAGE SYSTEM WITH ON-DEMAND RECOVERY OF FILE IMPORT METADATA DURING FILE SYSTEM MIGRATION

(71) Applicant: EMC IP Holding Company LLC, Hopkinton, MA (US)

(72) Inventors: Zexian Liao, Shanghai (CN); John Bankier, Bearsden (GB); Fei Long, Shanghai (CN); Yue Qian, Shanghai (CN); Xianfeng Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 15/582,713

(22) Filed: Apr. 30, 2017

(51) Int. Cl.
*G06F 7/00* (2006.01)
*G06F 16/11* (2019.01)
*G06F 11/14* (2006.01)

(52) U.S. Cl.
CPC ........ *G06F 16/119* (2019.01); *G06F 11/1469* (2013.01); *G06F 2201/80* (2013.01)

(58) Field of Classification Search
CPC ............. G06F 16/1752; G06F 16/1834; G06F 16/128; G06F 16/217; G06F 16/219; G06F 16/22; G06F 16/906
See application file for complete search history.

(56) References Cited

U.S. PATENT DOCUMENTS

| | | | |
|---|---|---|---|
| 7,080,221 B1 * | 7/2006 | Todd ................... | G06F 3/0605 707/999.201 |
| 7,272,613 B2 * | 9/2007 | Sim ..................... | H04L 67/1008 709/223 |
| 7,383,463 B2 * | 6/2008 | Hayden ............... | G06F 11/2069 714/4.11 |
| 7,660,902 B2 * | 2/2010 | Graham .............. | G06F 21/6245 709/203 |
| 7,707,151 B1 * | 4/2010 | Blumenau ............ | G06F 3/0617 709/232 |
| 7,770,053 B1 * | 8/2010 | Bappe ................. | G06F 11/0793 714/3 |
| 7,805,583 B1 * | 9/2010 | Todd ................... | G06F 3/0617 711/161 |
| 7,962,779 B2 | 6/2011 | Patel et al. | |
| 8,112,665 B1 * | 2/2012 | Somavarapu .......... | G06F 3/061 714/15 |
| 8,639,665 B2 | 1/2014 | Berman et al. | |

(Continued)

*Primary Examiner* — Daniel A Kuddus
(74) *Attorney, Agent, or Firm* — BainwoodHuang

(57) ABSTRACT

A user I/O operation is processed in a file system of a target data storage system (DSS) performing a file system migration. The target DSS assesses a migration state of a user file of the user I/O operation, including (1) determining whether a metadata file storing migration state data for the user file has an already recovered record indicating the migration state of the file, (2) if so, then using the already recovered record to assess the migration state of the user file, and (3) otherwise (a) initiating an on-demand recovery to obtain an on-demand record for the user file, and (b) using the on-demand recovered record to assess the migration state. If the migration state indicates that the file has not yet been migrated, then the user I/O operation is redirected to a separate source DSS, and otherwise the user I/O operation is completed locally at the target DSS.

18 Claims, 6 Drawing Sheets

(56) References Cited

U.S. PATENT DOCUMENTS

| | | | |
|---|---|---|---|
| 8,775,861 B1 * | 7/2014 | Raizen | G06F 11/1662 |
| | | | 714/4.12 |
| 8,799,413 B2 | 8/2014 | Taylor et al. | |
| 8,819,374 B1 * | 8/2014 | Don | G06F 3/0647 |
| | | | 711/112 |
| 8,914,334 B2 | 12/2014 | Berman et al. | |
| 8,977,896 B1 * | 3/2015 | Thigpen | G06F 3/06 |
| | | | 714/15 |
| 9,026,499 B1 * | 5/2015 | Rajimwale | G06F 16/288 |
| | | | 707/674 |
| 9,176,902 B1 * | 11/2015 | Long | G06F 13/14 |
| 9,323,758 B1 * | 4/2016 | Stacey | G06F 16/137 |
| 9,361,187 B2 | 6/2016 | Jarvis | |
| 9,460,097 B2 * | 10/2016 | Powell | G06F 16/188 |
| 9,633,064 B2 | 4/2017 | Gokhale | |
| 9,804,928 B2 * | 10/2017 | Davis | G06F 11/1464 |
| 2002/0133491 A1 * | 9/2002 | Sim | H04L 67/1008 |
| 2007/0094312 A1 * | 4/2007 | Sim-Tang | G06F 16/125 |
| 2015/0012567 A1 * | 1/2015 | Powell | G06F 16/188 |
| | | | 707/809 |
| 2016/0048351 A1 | 2/2016 | Kanteti et al. | |
| 2018/0246886 A1 * | 8/2018 | Dragomirescu | G06F 16/214 |

* cited by examiner

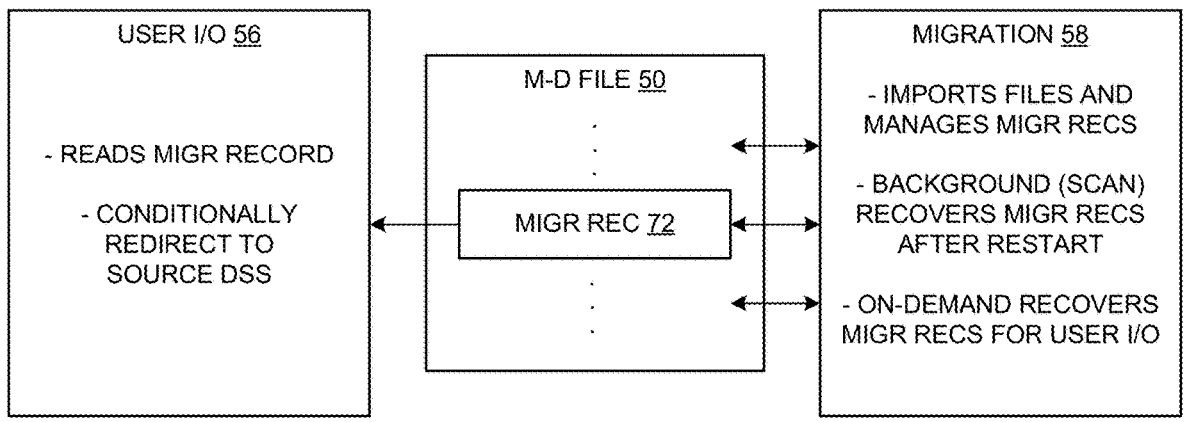
Fig. 5
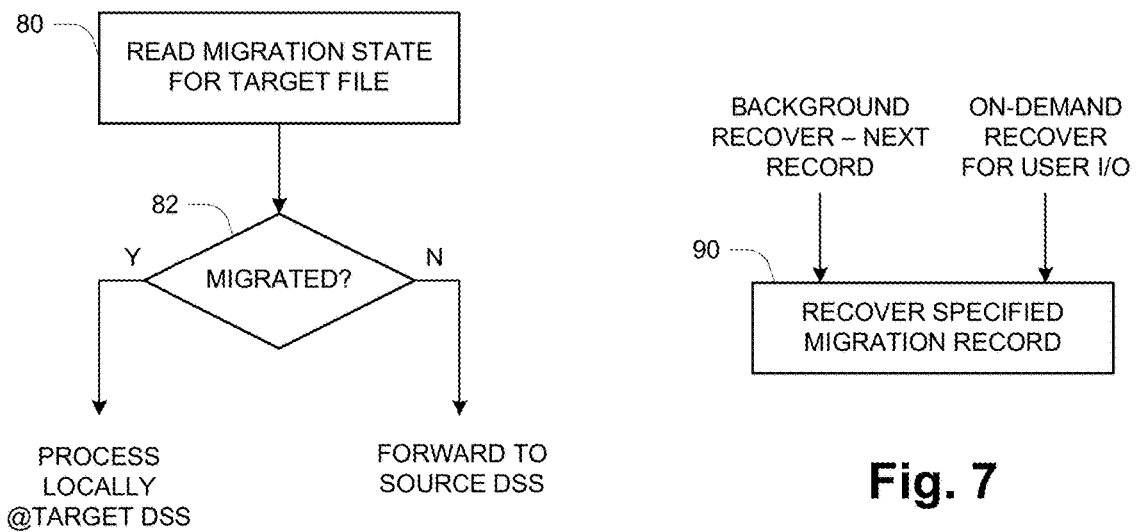
Fig. 6
Fig. 7

110 — ASSESS MIGRATION STATE OF TARGET USER FILE:

(1) FIRST DETERMINE WHETHER METADATA FILE HAS AN ALREADY RECOVERED RECORD FOR THE USER FILE ACCURATELY INDICATING THE MIGRATION STATE OF THE FILE, THE ALREADY RECOVERED RECORD HAVING BEEN RECOVERED BY SEPARATE RECOVERY PROCESS PERFORMED DURING RESTART
(2) IF THE METADATA FILE HAS AN ALREADY RECOVERED RECORD FOR THE USER FILE, THEN USE THE ALREADY RECOVERED RECORD TO ASSESS THE MIGRATION STATE OF THE USER FILE
(3) IF THE METADATA FILE DOES NOT HAVE AN ALREADY RECOVERED RECORD FOR THE USER FILE, THEN (A) INITIATE AN ON-DEMAND RECOVERY TO OBTAIN AN ON-DEMAND RECOVERED RECORD FOR THE USER FILE, AND (B) USE THE ON-DEMAND RECOVERED RECORD TO ASSESS THE MIGRATION STATE OF THE USER FILE

112 — CONDITIONALLY REDIRECT:

IF ASSESSED MIGRATION STATE INDICATES THAT THE FILE HAS NOT YET BEEN MIGRATED TO THE DATA STORAGE SYSTEM, THEN REDIRECT THE USER I/O OPERATION TO SEPARATE SOURCE DATA STORAGE SYSTEM FOR PROCESSING THE USER I/O OPERATION, AND OTHERWISE COMPLETE THE USER I/O OPERATION BY ACCESSING THE FILE AS PREVIOUSLY MIGRATED TO THE DATA STORAGE SYSTEM FROM THE SOURCE DATA STORAGE SYSTEM

DATA STORAGE SYSTEM WITH ON-DEMAND RECOVERY OF FILE IMPORT METADATA DURING FILE SYSTEM MIGRATION

BACKGROUND

The present invention is related to the field of data storage systems, and in particular to data storage systems having file system migration functionality for importing files from other data storage systems.

SUMMARY

A data storage system serving as a migration target performing file import employs a metadata file in stable storage to record and track the migration state of each inode (file or directory), such as "pending migration", "migrating" and "migrated". After a reboot, this metadata file must be scanned to identify the "pending migration", "migrating" and "failed" inodes before allowing any user IO. IOs to inodes having these states must be forwarded to a separate source data storage system for processing, because the target data storage system does not have the complete file data.

In some circumstances, such as during a reboot after a non-clean shutdown, there is a chance that the migration state as recorded in a metadata file does not accurately describe the actual migration state of the respective file. In this case the migration state information is unreliable and should not be used. It is necessary to first "recover" the contents of the metadata file to a stable condition, which generally requires scanning all the entries of the metadata file before allowing any user I/O that may require stable metadata for accurate processing.

The metadata file may be quite large, for example when implemented as a sparse file indexed by inode number. Scanning such a large metadata file can take substantial time, e.g., tens of minutes, so that simply suspending user IOs during that period could cause users to suffer an excessively long period of data unavailability.

A solution based on on-demand recovery of the metadata file is described herein, which allows user IOs before the metadata file scan completes and thus avoids any data unavailable period, while still guaranteeing data correctness to users.

More particularly, a method is disclosed of processing a user I/O operation in a file system of a data storage system, the data storage system operating as a target data storage system performing a migration operation to migrate the file system from a separate source data storage system. The method includes the steps, performed during a restart of the data storage system occurring during the migration operation, of:

assessing a migration state of a user file being the target of the user I/O operation, including (1) first determining whether a metadata file storing migration state data for the user file has an already recovered record for the user file accurately indicating the migration state of the file, the already recovered record having been recovered by a separate background recovery process performed during the restart, (2) if the metadata file has an already recovered record for the user file, then using the already recovered record to assess the migration state of the user file, and (3) if the metadata file does not have an already recovered record for the user file, then (a) initiating an on-demand recovery to obtain an on-demand recovered record for the user file, and (b) using the on-demand recovered record to assess the migration state of the user file; and if the assessed migration state indicates that the file has not yet been migrated to the data storage system, then redirecting the user I/O operation to a separate source data storage system for processing the user I/O operation, and otherwise completing the user I/O operation by accessing the file as previously migrated to the data storage system from the source data storage system.

By the above operation, metadata recovery occurs essentially non-disruptively, i.e., without causing excessively long delays that would occur if user I/O were to be suspended during the recovery period. Accurate recovery is achieved during a restart/recovery period with only limited effect on normal system operations.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 5 is a schematic depiction of usage of a migration metadata file by user I/O and migration functions;

FIG. 6 is a flow diagram of user I/O processing;

FIG. 7 is a flow diagram of usage of a migration record recovery function;

FIG. 10 is a flow diagram of processing of a user I/O; and

DETAILED DESCRIPTION

Overview

Figure 1:
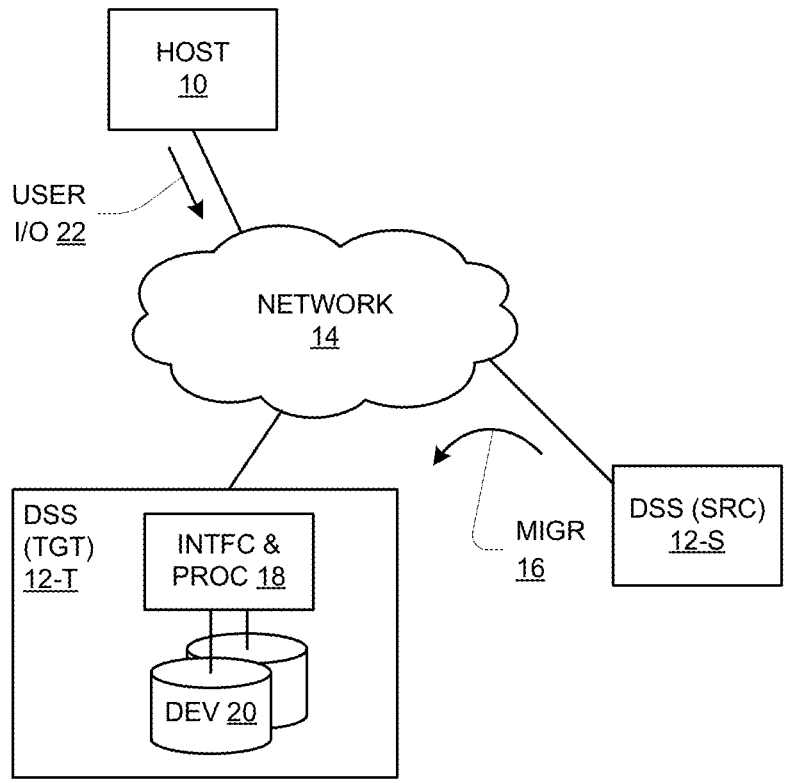
FIG. 1 is a block diagram of a data processing system.

A data storage system serving as a migration target performing file import has a metadata file in stable storage to record and track the migration state of each inode (file or directory) such as "pending migration", "migrating" and "migrated". After a reboot, this metadata file must be scanned to identify the "pending migration", "migrating" and "failed" inodes before allowing any user IO. IOs to inodes having these states must be forwarded to a separate source data storage system for processing, because the target data storage system does not have the complete file data.

When system operation is interrupted in a non-clean way, such as when an application or hardware suddenly stops functioning ("crashes"), there is a chance that the migration state as recorded in a metadata file does not accurately describe the actual migration state of the respective file. In this case the migration state information is unreliable and should not be used to assess the actual migration state of the file, for example in order to decide whether to process a user I/O locally or remotely at a source data storage system. Thus in this situation, it is necessary to first "recover" the contents of the metadata file to a stable condition before they are used. In general, it is necessary to scan all the entries of the metadata file, and to do so before allowing any user I/O that may require stable metadata for accurate processing.

One problem is that the metadata file may be quite large. The metadata file is preferably implemented as a sparse file that each inode in the file system will have an entry in, and is indexed by inode number. In a file system supporting up to 4 billion ($2^{32}$) inodes, the metadata file might 4 billion entries to scan. That means scanning the metadata file can take substantial time, e.g., tens of minutes, to complete, and if user IOs are denied during this period, users will suffer an excessively long period of data unavailability.

A solution based on on-demand recovery of the metadata file is described herein, which allows user IOs before the metadata file scan completes and thus avoids any data unavailable period, while still guaranteeing data correctness to users. Elements of this solution include:

- A background task that scans all inodes in the file system (e.g., in ascending order) and recovers the corresponding record in the metadata file.
- A scan pointer that identifies the current scanned inode. The inode number of all scanned inodes should be less than can pointer.
- The background inode scan task supporting multi-threaded operation to accelerate scan speed. Each thread is assigned an inode range to scan. In this case, the scan pointer becomes a range list. All scanned inodes are in this range list and considered less than the scan pointer, and the inode number of unscanned inodes are beyond this range list and considered greater than the scan pointer.
- Entries of the metadata file being on-demand recovered in the context of a user IO task when the migration state is needed to serve the IO.
- An in-memory map indexed by inode number (referred to as "on-demand recovered map") is used to identify on-demand recovered entries. The inode numbers in this map should be greater than scan pointer.

One difficulty is a potential race condition arising from parallelism of the background scan task and the on-demand recovery tasks (e.g. user IO tasks or migration tasks):

- The recovery of each record of the metadata file can be performed by multiple tasks concurrently, such as the background scanning task and the on-demand recovery task in the context of user IO task or migration engine task.
- The recovered entry can be read simultaneously by the user IO tasks and migration tasks.

The race condition is handled by using an in-memory read/write lock map indexed by inode number: any reading or recovering of the metadata record must acquire the read/write lock first. This map is empty initially, and when the lock is acquired for the first time, the lock is created and added into the map. After the background task has scanned the inode number, the lock is removed from this map. The map makes limited use of memory, as it tracks only inodes that have been accessed by user I/O during a recovery period and it becomes smaller as the background scanning proceeds.

DESCRIPTION OF EMBODIMENTS

FIG. 1 shows a data processing system including a host computer (HOST) 10 and a pair of data storage systems (DSS) 12 interconnected by a network 14. The data storage systems 12 are shown as a source (SRC) DSS 12-S and a target (TGT) DSS 12-T, referring to their participation in a file system migration (MIGR) operation 16. Each data storage system 12 includes interface and processing circuitry (INTFC & PROC) 18 as well as a set of data storage devices (DEV) 20 such as Flash arrays, magnetic disks, etc.

In operation, the devices 20 provide secondary storage of data used by applications (not shown) executing in the host 10. The applications generate user IO commands 22 (reads and writes) to access the data, which are sent to the target DSS 12-T via the network 14. The target DSS 12-T processes the commands and provides an appropriate response, including (1) for a write command, an indication of write completion, and (2) for a read command, the requested data. As generally known, a data storage system 12 may employ a device cache (not shown) that decouples the immediate processing of read and write commands from the underlying physical storage devices 20, generally speeding up operation. Large extents of data may be transferred from a device 20 to the cache, and subsequent reads are satisfied from the device cache with low latency. Similarly, writes may be satisfied by temporarily storing write data in the device cache with low latency, and later de-staging large extents of data from the device cache to a device 20.

The migration operation 16 involves transferring a host-accessible file system existing at the source DSS 12-S to the target DSS 12-T. Once the migration is complete, the file system is subsequently accessed only at the target DSS 12-T, and is removed from the source DSS 12-S. A file system migration may be performed, for example, as part of upgrading storage hardware in a data center, expanding the storage resources of a data center, etc. Migration logic within the target DSS 12-T is responsible for importing the files of the file system from the source DSS 12-S and making the imported files fully accessible locally, and this is generally done as non-disruptively as possible, i.e., as regular production operation of the target DSS 12-T is ongoing. One feature of the migration technique is that the file system is accessible at the target DSS 12-T during the migration, when not all files have yet been transferred. This creates a need for conditionally redirecting some user I/Os 22 to the source DSS 12-S, as explained more below along with other aspects of the non-disruptive migration.

Figure 2:
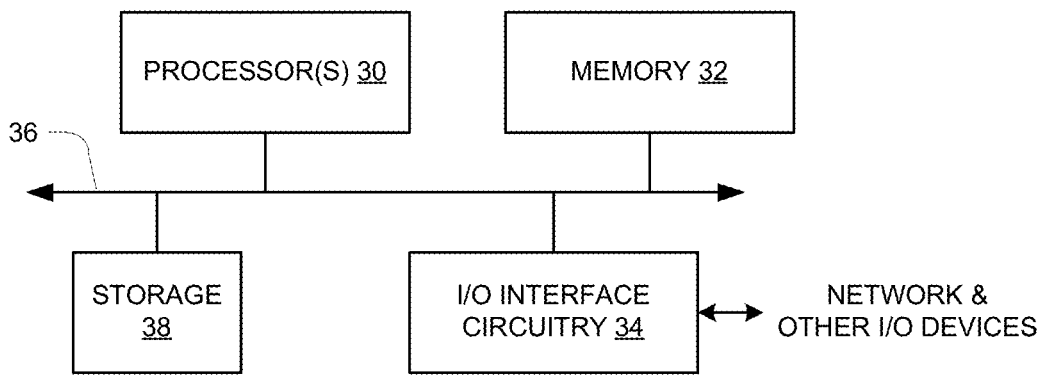
FIG. 2 is a block diagram of computer hardware.

FIG. 2 shows an example configuration of a computer such as a host 10 from a computer hardware perspective. The illustrated arrangement also generally describes the interface and processing circuitry 18 of the data storage system 12. The hardware includes one or more processors 30, memory 32, and interface circuitry 34 interconnected by data interconnections 36 such as one or more high-speed data buses. The interface circuitry 34 provides a hardware connection to the fabric 14 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, for example, can be referred to as a data storage circuit or data storage component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
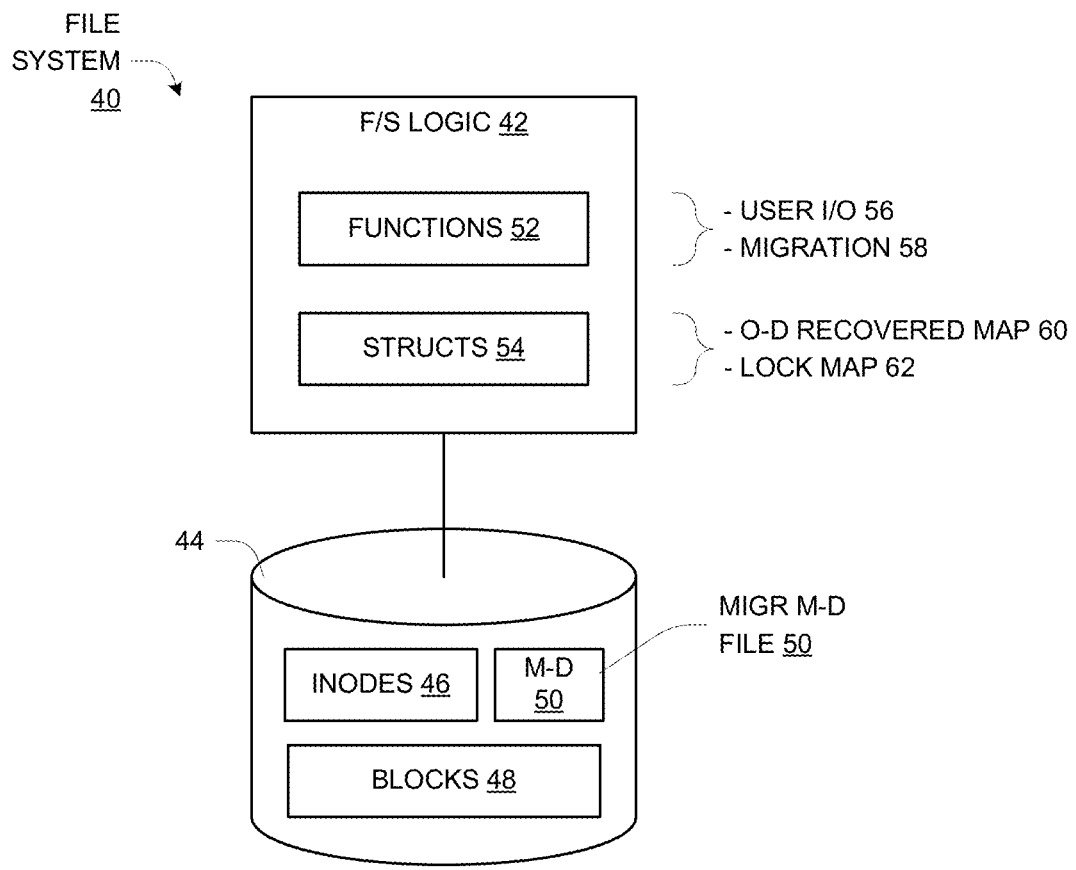
FIG. 3 is a schematic diagram of a file system.

FIG. 3 depicts the file system 40 that is the subject of the migration 16. It is shown as including file system (F/S) logic 42 as well as data persistently stored on an associated volume (VOL) 44. The volume 44 stores the canonical file system data which is a set of inodes 46 and a set of data blocks 48 containing the actual file data, logically organized into files by the inodes 46 as generally known in the art. It also stores a migration metadata (MIGR M-D, or just M-D) file 50 whose use is described more below. The file system logic 42 includes functions 52 and data structures (STRUCTS) 54. The functions 52 include a user I/O function 56 and migration functions 58, as indicated, and the data structures 54 include an on-demand (O-D) recovered map 60 and a lock map 62 as also indicated, these being used in connection with a recovery aspect of migration as described more below.

As mentioned above, one problem with recovering the M-D file 50 is that it may be quite large. It may be implemented as a so-called "sparse" file, having a logical size corresponding to the theoretical maximum number of inodes of the file system 40, which could be on the order of 4 billion ($2^{32}$) for example. The file is sparse because in typical operation there are vastly fewer existing inodes (corresponding to existing files) than the theoretical maximum. It is convenient to use a sparse file implementation because the file can be directly indexed by inode number, so it is easy to access individual entries. For recovery, it is generally necessary to scan the entire M-D file 50, and because of its large size this scanning can take quite long, e.g., tens of minutes for example. If user I/Os 22 are suspended in this period, users suffer undesirable data unavailability. As an example, an NFS client timeout may occur, which is a significant deleterious operating event.

Thus a solution described herein is based on on-demand recovery of the M-D file 50, which allows user IOs to proceed before the recovery scanning of the M-D file 50 completes. Correct file system data is used, and a data unavailable period is avoided. Elements of the solution are described in more detail below.

Figure 4:
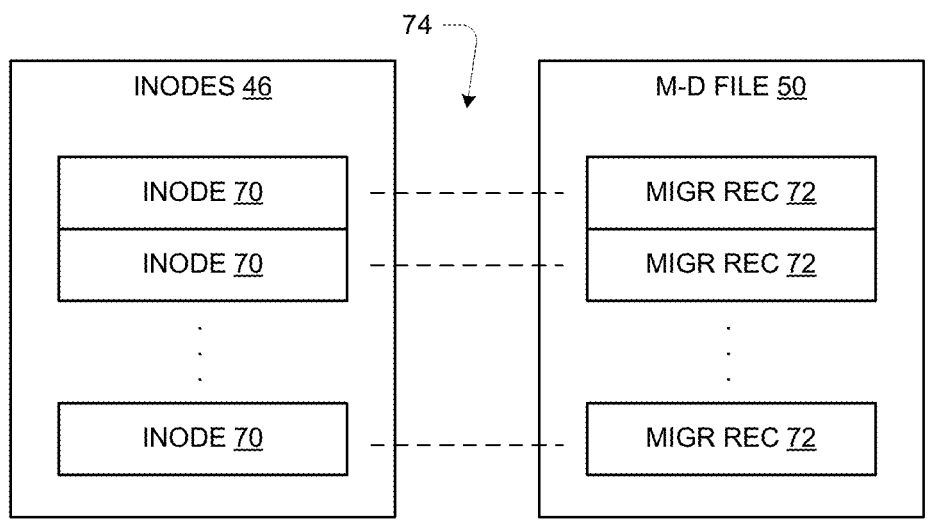
FIG. 4 is a schematic depiction of a relationship between file system inodes and migration records of a migration metadata file.

FIG. 4 shows a relationship between the nodes 46 and the M-D file 50. Individual inodes 70 generally correspond to respective files, including regular user files (e.g., user documents) as well as system files such as directory files (directories), etc. The M-D file 50 contains respective migration records (MIGR RECs) 72 for the files of the file system 40, which is indicated by associations 74 between the records 72 and respective inodes 70. As mentioned above, a migration record 72 includes migration state data reflecting a state of migration of the corresponding file. Generally, the migration state proceeds from an initial "Pending" state (not yet migrated) to "Migrating" (file import has begun but not completed) to "Migrated" (file has been fully imported to target DSS 12-T). There may also be a "Failed" state indicating that an attempted import has failed, for example.

FIG. 5 depicts certain usage the M-D file 50, which supports both the migration functions or processes 58 as well as the user I/O function or process 56.

The user I/O function 56 reads migration records 72 to obtain the migration state of a file that is the target of a user I/O command 22, and uses the migration state data to determine whether or not it is necessary to redirect the user I/O to the source DSS 12-S. Briefly, if the file has already been migrated to the target DSS 12-T, then the user I/O 22 can be processed locally, i.e., by accessing the file as stored on the local volume 44 of the target DSS 12-T. If the file has not yet been migrated, then the user I/O 22 must be forwarded to the source DSS 12-S for processing. This operation is described more below.

The migration functions 58 use the migration records 72 to track the migration state of files, and are primarily responsible for creating, updating, and otherwise managing the migration records 72. The migration functions 58 include recovery of migration records 72 in the event of a restart of migration after a non-clean interruption, such as occurs during a sudden system shutdown (crash) for example. For this recovery the migration functions 58 employ a background process that scans the entire M-D file 50 and recovers migration records 72 as necessary. The migration functions 58 also perform on-demand recovery of migration records 72 to assist in processing user I/O, as described more below.

FIG. 6 shows the above-mentioned functionality of the user I/O function 72. At 80, it accesses the migration record 72 for a file that is the target of a user I/O command 22 in order to obtain the migration state of that file. At 82 it determines from the migration state whether the file has been migrated to the target DSS 12-T. If so, then it processes the user I/O command 22 locally at the target DSS 12-T (i.e., performs the read or write operation and returns a corresponding response to the host 10). Otherwise, it forwards the user I/O command 22 to the source DSS 12-S for processing. In this forwarding operation, the target DSS 12-T serves as an initiator of a forwarded I/O command that is sent to the source DSS 12-S, and it receives a corresponding response (write complete or read data) returned by the source DSS 12-S. The user I/O function 56 of the target DSS 12-T then forwards the response to the host 10 to complete the original user I/O command 22.

FIG. 7 illustrates certain high-level operations of the migration functions 58. In particular these employ a function 90 of recovering a specified migration record 72. As mentioned above, the migration functions 58 include a background recovery process that scans the M-D file 50 as part of a post-restart recovery. The background recovery process works sequentially through all the migration records 72, and thus one use of the function 90 is by the background process recovering a next sequential record, which is specified to the function 90. The migration functions 58 also include on-demand recovery of a migration record 72 to satisfy a user I/O command 22, and thus another use of the function 90 is the on-demand recovery of a specified migration record 72 for a file that is the target of a user I/O command 22.

Generally the function 90 examines the specified record 72 and conditionally modifies it from a transient state to a non-transient state. That is, if the record 72 indicates that an import was "in progress" for the corresponding file, it is assumed that the shutdown or other event preceding this recovery left the file in an indeterminate state, so it is necessary to restart the importation/migration of the file. Thus, the state is changed to "pending" to indicate that the migration of the file must be started from the beginning.

Figure 8:
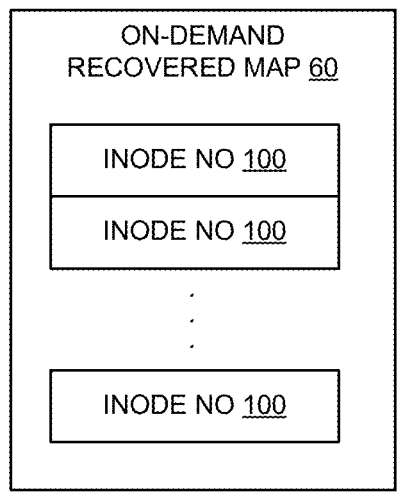
FIG. 8 is a schematic diagram of an on-demand recovered map.

FIG. 8 shows the on-demand recovered map 60. It basically is a content-addressed listing of inode numbers 100 for files whose M-D records 72 have been on-demand recovered during a post-restart recovery period. During the recovery period, there are two reasons to know which records 72 have been recovered. One is for the recovery process itself—it tracks recovery of the records 72 so as to know when all have been recovered. For the background scan process, this can be accomplished using a single incrementing pointer (called a "scan pointer") pointing to the next sequential record 72 to be recovered. Once the pointer has advanced to the very last record 72, then the scan is complete. Information about record recovery is also needed to manage on-demand recovery—if a record 72 has already been on-demand recovered, then it need not be on-demand recovered again. Thus, the on-demand recovered map 60 is used in the context of user I/O processing and potential on-demand recovery as explained below. It should be noted, incidentally, that in a typical embodiment all of the inode numbers 100 in the on-demand recovered map 60 are greater than the value of the background recovery scan pointer at a given time.

Figure 9:
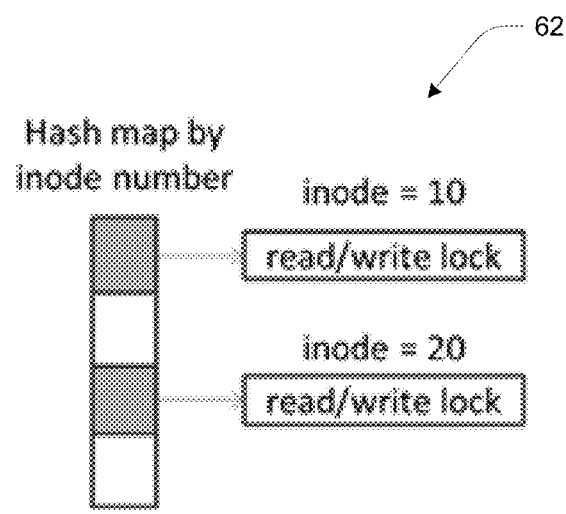
FIG. 9 is a schematic diagram of lock map.

FIG. 9 illustrates the in-memory lock map 62 which is used to manage potential race conditions in accessing/updating records 72 of the M-D file 50. The lock map 62 is also content-addressed, and may be implemented using a hash function of inode number for example. As explained more below, any process of reading or recovering the corresponding M-D record 72 must acquire the read/write lock first. This map is empty initially, and when a lock is acquired for the first time, it is created and added into the map. After the background recovery function of the migration functions 58 has scanned the record 72 for a given inode number, the lock is removed from this map 62. This map is generally small in terms of memory usage, as it is used to track only the records 72 for files accessed by user I/O, and it becomes smaller as the background recovery scan proceeds.

In the use described herein, most tasks are reading the lock map 62 and only one task will do the metadata record recovery, and thus the lock performance is enhanced by always trying to read the lock first and upgrading to the write lock if metadata entry recovery is needed. This approach enables task parallelism to the maximum extent. Details of use of the lock are described below.

FIG. 10 is a high-level description of processing of a user I/O operation (e.g., 22) in a file system (e.g., 40) of a data storage system, the data storage system operating as a target data storage system (e.g., 12-T) performing a migration operation (e.g., 16) to migrate the file system to the target data storage system from a separate source data storage system (e.g., 12-S). As mentioned, this processing is performed during a restart in which there has been a non-clean interruption, so that it is necessary to recover records (e.g., 72) of a metadata file (e.g., 50) that tracks migration state.

At 110, the process assesses a migration state of a user file being the target of the user I/O operation. This includes (1) first determining whether a metadata file storing migration state data for the user file has an already recovered record for the user file accurately indicating the migration state of the file, the already recovered record having been recovered by a separate recovery process performed during the restart, (2) if the metadata file has an already recovered record for the user file, then using the already recovered record to assess the migration state of the user file, and (3) if the metadata file does not have an already recovered record for the user file, then (a) initiating an on-demand recovery to obtain an on-demand recovered record for the user file, and (b) using the on-demand recovered record to assess the migration state of the user file.

At 112, if the assessed migration state indicates that the file has not yet been migrated to the data storage system, then the user I/O operation is redirected to a separate source data storage system for processing the user I/O operation, and otherwise the user I/O operation is completed by accessing the file as previously migrated to the data storage system from the source data storage system.

Referring again to the steps at 110, it will be appreciated that there are two ways that a record 72 has already been recovered, and thus in general the determination at (1) may involve multiple sub-determinations. One is whether the inode number for the target file is less than the background recovery scan pointer, in which case the background recovery process has already recovered the record and thus the record is usable for assessing migration state. The other sub-determination is whether the inode number for the target file is in the on-demand recovered map, in which case the record has already been on-demand recovered and thus it is usable for assessing migration state. In one embodiment these assessments are performed in series, e.g., by first checking against the scan pointer and then checking the on-demand recovery map, but in alternative embodiments other specific logic may be used.

FIG. 10 shows the potential initiation of on-demand recovery of a record 72 in connection with user I/O. In general, there are multiple independent functions/processes contending for access to the records 72 of the M-D file 50, including the user I/O function 56 and the migration functions 58 for example. To manage this contention, these functions also include logic for utilizing the lock map 62. Below is a description of use of the lock map 62 in connection with initiating on-demand recovery for a user I/O, which would be done as part of the operations at 110 in FIG. 10 for example. It will be appreciated that the migration functions 58 implement analogous logic using the lock map 62 to manage potential race conditions.

```
Pseudocode description of on-demand recovery of M-D record 72:
Need_write_lock = false
Upgrade_lock:
    IF Need_write_lock == false THEN
        Read lock by inode number
    ELSE
        Write lock by inode number
    ENDIF
    IF record already scanned THEN       /true if inode number less than scan pointer
        Do nothing as the record already recovered by background task
    ELSE
        IF inode number in O-D recovered map THEN
            Do nothing as the record already on-demand recovered
        ELSE
            IF Need_write_lock == false THEN
                Unlock by inode number
                Need_write_lock == true
                Goto Upgrade_lock
            ELSE
```

-continued

```
        Do on-demand recovery of the record
        Add the inode number into on-demand recovered map
      ENDIF
    ENDIF
  ENDIF
  Unlock by inode number
```

Figure 11:
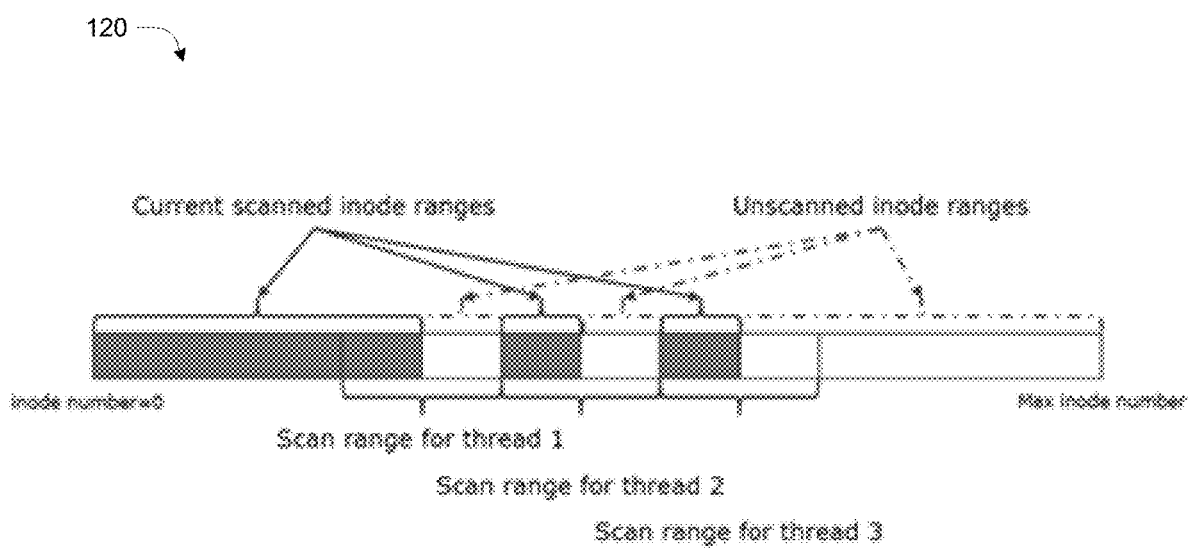
FIG. 11 is a schematic diagram of a multi-threaded background recovery process.

FIG. 11 illustrates aspects of operation of the background recovery process 120, in particular when it is implemented in a multi-threaded manner, i.e., employing multiple independent execution threads to collectively scan the entire contents of the M-D file 50.

Below is a pseudocode description:

```
Write lock by inode number
IF inode number in on-demand recovered map THEN
  Remove inode number and the read/write lock from
    on-demand recovered map
ELSE
  Do recovery of the metadata entry
ENDIF
Advance current scanned inode
Unlock by inode number
```

Thus disclosed is a method of processing a user I/O operation in a file system of a data storage system, the data storage system operating as a target data storage system performing a migration operation to migrate the file system to the target data storage system from a separate source data storage system. The method includes the steps, performed during a restart of the data storage system occurring during the migration operation, of:

assessing a migration state of a user file being the target of the user I/O operation, including (1) first determining whether a metadata file storing migration state data for the user file has an already recovered record for the user file accurately indicating the migration state of the file, the already recovered record having been recovered by a separate background recovery process performed during the restart, (2) if the metadata file has an already recovered record for the user file, then using the already recovered record to assess the migration state of the user file, and (3) if the metadata file does not have an already recovered record for the user file, then (a) initiating an on-demand recovery to obtain an on-demand recovered record for the user file, and (b) using the on-demand recovered record to assess the migration state of the user file; and if the assessed migration state indicates that the file has not yet been migrated to the data storage system, then redirecting the user I/O operation to a separate source data storage system for processing the user I/O operation, and otherwise completing the user I/O operation by accessing the file as previously migrated to the data storage system from the source data storage system.

In some embodiments, the system and its operation include some/all of the following:

Use of an on-demand recovered map

Concurrency or parallelism of tasks, along with use of a lock map

Details as described above of the logic/functions for scanning, recovery etc.

Implementation of the metadata file as a logically large, sparse file, which can increase maximum scan time and thus motivate use of the disclosed technique Processing in connection with a non-clean interruption such as shutdown/restart, specific progression of migration states, and specific handling of files for which migration was in-progress (i.e., restarting a file import)

Use of a multi-threaded background scanning process

While various embodiments of the invention have been particularly shown and described, it will be understood by those skilled in the art that various changes in form and details may be made therein without departing from the spirit and scope of the invention as defined by the appended claims.

What is claimed is:

1. A computer-implemented method of processing a user I/O operation in a file system of a data storage system, the data storage system operating as a target data storage system performing a migration operation to migrate the file system to the target data storage system from a separate source data storage system, the method comprising the steps, performed by the target data storage system during a restart of the target data storage system occurring during the migration operation, of:

assessing a migration state of a user file being the target of the user I/O operation, including (1) first determining whether a metadata file storing migration state data for the user file has an already recovered record for the user file accurately indicating the migration state of the file, the already recovered record having been recovered by a separate background recovery process performed during the restart, (2) when the metadata file has an already recovered record for the user file, then using the already recovered record to assess the migration state of the user file, and (3) when the metadata file does not have an already recovered record for the user file, then (a) initiating an on-demand recovery to obtain an on-demand recovered record for the user file, and (b) using the on-demand recovered record to assess the migration state of the user file; and when the assessed migration state indicates that the file has not yet been migrated to the data storage system, then redirecting the user I/O operation to a separate source data storage system for processing the user I/O operation, and otherwise completing the user I/O operation by accessing the file as previously migrated to the data storage system from the source data storage system, wherein the on-demand recovery includes use of an on-demand recovered map being a content-addressed listing of inode numbers for files whose metadata records have been on-demand recovered during a post-restart recovery period.

2. The method of claim 1, wherein the on-demand recovery is performed in addition to a separate background recovery to recover metadata records not involved in current user I/O operations, the background recovery using a background recovery scan pointer continually pointing to a next sequential record to be background recovered, and wherein all of the inode numbers in the on-demand recovered map are generally greater than the value of the background recovery scan pointer at a given time.

3. The method of claim 1, wherein the assessing includes use of an in-memory lock map to manage potential race conditions in accessing/updating records of the metadata file.

4. The method of claim 3, wherein the lock map is content-addressed and implemented using a hash function of inode number.

5. The method of claim 3, wherein reading or recovering a metadata record of the metadata file first acquires a read/write lock, the lock being added into the memory lock map when the lock is acquired for the first time, and the lock being removed from the memory lock map after a background recovery function has scanned the record.

6. The method of claim 1, wherein the determining includes two sub-determinations including (1) whether an inode number for the target file is less than a background recovery scan pointer, in which case a background recovery process has already recovered the record and thus the record is usable for assessing migration state, and (2) whether the inode number for the target file is in the on-demand recovered map, in which case the record has already been on-demand recovered and thus it is usable for assessing migration state.

7. The method of claim 1, wherein the metadata file is implemented as a sparse file having a logical size corresponding to a theoretical maximum number of inodes of the file system, whereas an actual number of inodes during operation corresponds to a number of actually existing files substantially less than the theoretical maximum, the sparse file being directly indexed by inode number for accessing individual entries, and wherein it is generally necessary to scan the entire metadata file for recovery, requiring a time period longer than a timeout period for processing the user I/O operation.

8. The method of claim 1, performed during a reboot after a non-clean shutdown in which the migration state as recorded in a metadata file does not accurately describe the actual migration state of the respective file.

9. The method of claim 1, further including use of a background recovery process implemented in a multi-threaded manner employing multiple independent execution threads to collectively scan an entirety of the metadata file in the background while user I/O operations are proceeding in the foreground.

10. A data storage system including secondary storage devices and processing and interface circuitry configured and operative to execute computer program instructions to realize a file system and to perform a method of processing a user I/O operation in the file system, and to operate the data storage system as a target data storage system performing a migration operation to migrate the file system to the target data storage system from a separate source data storage system during a restart of the target data storage system occurring during the migration operation, the method including:
    assessing a migration state of a user file being the target of the user I/O operation, including (1) first determining whether a metadata file storing migration state data for the user file has an already recovered record for the user file accurately indicating the migration state of the file, the already recovered record having been recovered by a separate background recovery process performed during the restart, (2) when the metadata file has an already recovered record for the user file, then using the already recovered record to assess the migration state of the user file, and (3) when the metadata file does not have an already recovered record for the user file, then (a) initiating an on-demand recovery to obtain an on-demand recovered record for the user file, and (b) using the on-demand recovered record to assess the migration state of the user file; and
    when the assessed migration state indicates that the file has not yet been migrated to the data storage system, then redirecting the user I/O operation to a separate source data storage system for processing the user I/O operation, and otherwise completing the user I/O operation by accessing the file as previously migrated to the data storage system from the source data storage system,
    wherein the on-demand recovery includes use of an on-demand recovered map being a content-addressed listing of inode numbers for files whose metadata records have been on-demand recovered during a post-restart recovery period.

11. The data storage system of claim 10, wherein the on-demand recovery is performed in addition to a separate background recovery to recover metadata records not involved in current user I/O operations, the background recovery using a background recovery scan pointer continually pointing to a next sequential record to be background recovered, and wherein all of the inode numbers in the on-demand recovered map are generally greater than the value of the background recovery scan pointer at a given time.

12. The data storage system of claim 10, wherein the assessing includes use of an in-memory lock map to manage potential race conditions in accessing/updating records of the metadata file.

13. The data storage system of claim 12, wherein the lock map is content-addressed and implemented using a hash function of inode number.

14. The data storage system of claim 12, wherein reading or recovering a metadata record of the metadata file first acquires a read/write lock, the lock being added into the memory lock map when the lock is acquired for the first time, and the lock being removed from the memory lock map after a background recovery function has scanned the record.

15. The data storage system of claim 10, wherein the determining includes two sub-determinations including (1) whether an inode number for the target file is less than a background recovery scan pointer, in which case a background recovery process has already recovered the record and thus the record is usable for assessing migration state, and (2) whether the inode number for the target file is in the on-demand recovered map, in which case the record has already been on-demand recovered and thus it is usable for assessing migration state.

16. The data storage system of claim 10, wherein the metadata file is implemented as a sparse file having a logical size corresponding to a theoretical maximum number of inodes of the file system, whereas an actual number of inodes during operation corresponds to a number of actually existing files substantially less than the theoretical maximum, the sparse file being directly indexed by Mode number for accessing individual entries, and wherein it is generally necessary to scan the entire metadata file for recovery, requiring a time period longer than a timeout period for processing the user I/O operation.

17. The data storage system of claim 10, wherein the method is performed during a reboot after a non-clean shutdown in which the migration state as recorded in a metadata file does not accurately describe the actual migration state of the respective file.

18. The data storage system of claim 10, wherein the method further includes use of a background recovery process implemented in a multi-threaded manner employing multiple independent execution threads to collectively scan an entirety of the metadata file in the background while user I/O operations are proceeding in the foreground.

\* \* \* \* \*